United States Patent
Ota et al.

(10) Patent No.: US 6,706,082 B2
(45) Date of Patent: Mar. 16, 2004

(54) CRYSTALLINE CERIC OXIDE SOL AND PROCESS FOR PRODUCING THE SAME

(75) Inventors: Isao Ota, Nei-gun (JP); Tohru Nishimura, Sodegaura (JP); Kenji Tanimoto, Nei-gun (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/076,500

(22) Filed: Feb. 19, 2002

(65) Prior Publication Data

US 2003/0007920 A1 Jan. 9, 2003

(30) Foreign Application Priority Data

Feb. 27, 2001 (JP) ........................................ 2001-052483

(51) Int. Cl.[7] .............................. C01P 17/00; C09G 1/02
(52) U.S. Cl. .............................. 51/307; 51/309; 51/298; 106/3; 423/263
(58) Field of Search .................... 51/307, 309, 298; 106/3; 423/263

(56) References Cited

U.S. PATENT DOCUMENTS

| 5,064,628 | A | 11/1991 | Chane-Ching et al. |
| 5,376,304 | A | 12/1994 | Yamamoto et al. |
| 5,389,352 | A | 2/1995 | Wang |
| 5,733,361 | A | 3/1998 | Chane-Ching et al. |
| 5,962,343 | A | * 10/1999 | Kasai et al. ................. 438/693 |
| 6,478,836 | B1 | * 11/2002 | Kido et al. .................... 51/309 |

FOREIGN PATENT DOCUMENTS

| EP | 0 822 164 A2 | 2/1998 |
| JP | A 10-95614 | 4/1998 |
| WO | WO 00/76920 A1 | 12/2000 |

* cited by examiner

*Primary Examiner*—Michael Marcheschi
(74) *Attorney, Agent, or Firm*—Oliff & Berridge, PLC

(57) ABSTRACT

Substantially monodisperse crystalline ceric oxide sols and processes for producing such sols are provided. Sols include crystalline ceric oxide particles having a particle size I (particle size converted from specific surface area by gas absorption method) ranging from 10 nm to 200 nm and a ratio of particle size II (particle size measured by dynamic light scattering method) to particle size I ranging from 2 to 6. Sols can be prepared by reacting a cerium (III) salt with an alkaline substance in an aqueous medium under an inert gas atmosphere to obtain a suspension of cerium (III) hydroxide, immediately blowing oxygen or a gas containing oxygen into the suspension to obtain a sol comprising crystalline ceric oxide particles, and wet grinding the resulting sol. Sols are also prepared by calcining cerium carbonate at a temperature of 300 to 1100° C. to give cerium oxide particles, and wet-grinding the resulting particles.

11 Claims, No Drawings

CRYSTALLINE CERIC OXIDE SOL AND PROCESS FOR PRODUCING THE SAME

BACKGROUND OF THE INVENTION

1. Field of the Invention

The present invention relates to a crystalline ceric oxide sol that is approximately monodisperse, and a process for producing the sol.

2. Description of the Related Art

Japanese Patent Laid-open No. Hei 10-95614 discloses a process for producing ceric oxide particles in which the process comprises reacting a cerium (III) salt with an alkaline substance in $(OH^-)/(Ce^{3+})$ molar ratio ranging from 3 to 30 to form a suspension of cerium (III) hydroxide, and immediately blowing oxygen or a gas containing oxygen into the suspension under atmospheric pressure at a temperature of 10 to 95° C.

A sol comprising ceric oxide particles in a aqueous liquid prepared by the process disclosed in the Japanese patent publication has a specific surface area of 30 $m^2/g$ by gas adsorption method (BET method), and therefore the particle size thereof converted by BET method is 28 nm. The particle size of the sol measured by dynamic light scattering method is 306 nm. Accordingly, the ratio of the particle size measured by dynamic light scattering method to the particle size converted from a specific surface area by gas adsorption method is 11. Therefore, the sol is open to investigation on the sedimentation thereof, and there is a problem that the particles therein sediment and deposit on standing for a long time. Thus, in a case where the sol is used as an abrasive, it is necessary to re-disperse the sol by vigorously stirring it with a diaper and the like.

SUMMARY OF THE INVENTION

Accordingly, it is an object of the present invention to provide a process for producing a sol with high monodispersion properties. When the sol is used for polishing, it can prevent very small surface defects on the polished surface from occurring.

According to a first aspect of the present invention, there is provided a sol comprising crystalline ceric oxide particles, in which the particles have particle size I ranging from 10 nm to 200 nm and a ratio of particle size II to the particle size I ranging from 2 to 6, wherein the particle size I is a particle size converted from a specific surface area by gas adsorption method, and the particle size II is a particle size measured by dynamic light scattering method.

According to a second aspect of the present invention, there is provided a process for producing a sol comprising crystalline ceric oxide particles according to the first aspect, in which the process comprises the following steps A and B:

Step A of reacting a cerium (III) salt with an alkaline substance in $(OH^-)/(Ce^{3+})$ molar ratio ranging from 3 to 30 in an aqueous medium under an inert gas atmosphere to give a suspension of cerium (III) hydroxide, and immediately blowing oxygen or a gas containing oxygen into the suspension at a temperature of 10 to 95° C. under an atmospheric pressure to give a sol comprising crystalline ceric oxide particles, in which the particles have particle size I ranging from 10 nm to 200 nm and a ratio of particle size II to the particle size I ranging 10 or more, wherein the particle size I is a particle size converted from a specific surface area by gas adsorption method, and the particle size II is a particle size measured by dynamic light scattering method; and Step B of wet-grinding the sol obtained in step A.

According to a third aspect of the present invention, in the process of the second aspect, the alkaline substance is a hydroxide of alkaline metal, an organic base or a mixture thereof.

According to a fourth aspect of the present invention, in the process of the second or third aspect, the gas containing oxygen is air or a mixed gas of oxygen and nitrogen.

According to a fifth aspect of the present invention, there is provided a process for producing a sol comprising crystalline ceric oxide particles according to the first aspect, wherein the process comprises the following steps a and b:

Step a of calcining cerium carbonate at a temperature of 300 to 1100° C. to give crystalline cerium oxide particles; and Step b of wet-grinding the particles obtained in step a.

According to a sixth aspect of the present invention, in the process of the second to fifth aspect, the wet-grinding is carried out with a wet-ball mill, a sand grinder, an attritor, a perl mill an ultrasonic homogenizer, a pressure homogenizer or an ultimaizer.

According to a seventh aspect of the present invention, there is provided an aqueous slurry comprising organic-inorganic complex particles, in which the crystalline ceric oxide particles according to the first aspect are adsorbed on negatively charged polymer particles (polymer particles having negative charge).

DESCRIPTION OF THE PREFERRED EMBODIMENTS

The sol of the present invention comprises ceric oxide particles high in crystallinity. The ceric oxide particles have a specific surface area ranging from 4 to 83 $m^2/g$ by gas adsorption method (BET method), and the particle size thereof converted from the specific surface area value is 10 to 200 nm The particle size converted from specific surface area by the BET method (hereinafter referred to also as "particle size I") shows the mean of the particle size of each particle.

Further, the particle size by dynamic light scattering method (hereinafter referred to also as particle size II) is measured with the aid of N4 (manufactured by Coulter Electronics, Inc.), DLS-6000 (manufactured by Otsuka Electronics Co, Ltd.), and the values range from 20 to 800 nm. The particle size determined by dynamic light scattering method shows that of particles in a sol. Therefore, when the particles are aggregated or held together, the particle size thereof is measured in such a state.

The crystalline ceric oxide particles in the sol of the present invention have particle size I ranging from 10 to 200 nm and a ratio of particle size II to a particle size I (that is, the ratio=(particle size by dynamic light scattering method)/(particle size converted from specific surface area by gas adsorption method)) ranging from 2 to 6. The low ratio means that the difference between the particle size converted from a specific surface area by gas adsorption method and the particle size measured by dynamic light scattering method is smaller than that of the prior sol comprising crystalline ceric oxide particles, and the particles in the sol of the present invention are relatively small state that they are aggregated and thus the sol is approximately monodisperse.

The sol of the present invention can be produced through the following steps A and B.

The step A for producing the sol of the present invention comprises reacting a cerium (III) salt with an alkaline substance in $(OH^-)/(Ce^{3+})$ molar ratio ranging from 3 to 30 in an aqueous medium under an inert gas atmosphere to give a suspension of cerium (III) hydroxide, and immediately blowing oxygen or a gas containing oxygen into the suspension at a temperature of 10 to 95° C. under an atmospheric pressure to give a sol comprising crystalline ceric oxide particles, in which the particles have particle size X ranging from 10 to 200 nm and a ratio of particle size II to the particle site I ranging 10 or more.

The cerium (III) salts include, for example cerium (III) nitrate, cerium (II) chloride, cerium (III) sulfate, cerium (III) carbonate, ammonium cerium (III) nitrate. The cerium (III) salts may be used alone or in a mixture thereof The alkaline substances include, for example alkaline metal hydroxides, such as sodium hydroxide and potassium hydroxide; organic bases, such as ammonia, amines and quaternary ammonium hydroxide. In particular, ammonia, sodium hydroxide and potassium hydroxide are preferred. These may be used alone or in a mixture thereof.

The gases containing oxygen include, for example air, oxygen, a mixed gas of oxidizing gas, such as oxygen with an inert gas, such as nitrogen. Air is preferable from the view points of economical efficiency and handling.

The step B comprises wet-grinding the sol obtained in the step A.

In addition, the sol of the present invention can be produced through the following steps a and b.

The step a comprises calcining cerium carbonate at a temperature of 300 to 1100° C. to give crystalline cerium oxide particles. The cerium carbonate may be commercial cerium carbonate having the average particle size ranging from several $\mu$m to 100 $\mu$m.

The calcinating at a temperature below 300° C. causes insufficient oxidation, and thus is not preferable. On the other hand, the calcinating at a temperature above 1100° C. makes the primary particle size of the resulting ceric oxide 300 nm or more, and also is not preferable.

The step b comprises wet-grinding the crystalline cerium oxide particles obtained in the step a to give a sol comprising crystalline ceric oxide particles.

The steps B and b for producing the sol of the present invention comprise wet-grinding the crystalline ceric oxide sol or the crystalline ceric oxide particles obtained in the step A or a, respectively. The wet-grinding may be carried out with an apparatus, such as a wet-ball mill, a sand grinder, an attritor, a per) mill, an ultrasonic homogenizer, a pressure homogenizer or an ultimaizer.

The step B after the step A comprises wet-grinding the sol obtained in the step A until the ratio of particle size II to particle size I ranges from 2 to 6 while the particle size I obtained in the step A is maintained.

That is, the step B is carried out in order to divide particles that are held together weakly at a point without making the primary particle size of the crystalline ceric oxide particles smaller. Accordingly, particle size I of the particles after the step B is almost equal to that after the step A.

On the other hand, the step b comprising wet-grinding after the step a results in separation of particles the primary particle size of which are held together at plains in the step a without rupturing the primary particle size. Therefore, new planes are produced by peeling planes held together in the step b. Thus, the particle size I of the particles after the step b becomes smaller than that after the step a It is preferable to mix quaternary ammonium ion ($NR_4^+$, wherein R is an organic group) with the sol comprising crystalline ceric oxide particles according to the present invention in a molar ratio of $NR_4^+/(CeO_2)$ ranging from 0.001 to 1 to give alkaline sol having high stability after removing impurities with the aid of cleaning, such as ultrafiltration, filter press cleaning or the like.

The quaternary ammonium ion can be obtained by adding quaternary ammonium silicate, quaternary ammonium halide, quaternary ammonium hydroxide or a mixture thereof, in particular quaternary ammonium silicate and quaternary ammonium hydroxide are preferable Further, a small amount of acid or base can be added. In a case where acid is used, it is preferable to add water-soluble acid in a molar ratio of $[H^+]/[CeO_2]$ ranging from 0.001 to 1 to give an acid sol having high stability The acidic sol has pH ranging from 1 to 6, preferably 2 to 6. The water-soluble adds include for example inorganic acid, such as hydrogen chloride, nitric acid or the like, organic acid, such as formic add, acetic acid, oxalic acid, citric acid, lactic acid or the like, an acidic salt thereof or a mixture thereof. Also, an alkaline sol may be obtained by adding a water-soluble base in a molar ratio of $[OH^-]/[CeO_2]$ ranging from 0.001 to 1. The alkaline sol has pH ranging from 8 to 13, preferably 9 to 13. The water-soluble base include for example ethanolamine, diethanolamine, triethanolamine, N,N-dimethyl-ethanolamine, N-methylethanolamine, monopropanolamine and ammonia, potassium hydroxide, etc. in addition to quaternary ammonium hydroxide and quaternary ammonium silicate.

The sol comprising crystalline ceric oxide particles according to the present invention can be improved in stability as a sol by adding the above-mentioned base or acid after the step B or b However, it can be carried out to wet-grind or wet-crash with a wet-ball mill, a sand grinder, an attritor (e.g., manufactured by Mitsui Mining Ltd.), a perl mill (e.g., manufactured by Ashizawa Ltd.,), an ultrasonic homogenizer (e.g., manufactured by Nissei Ltd.), a pressure homogenizer (e.g., manufactured by SMT Ltd.) or an ultimaizer (e.g., manufactured by Sugino Machine Ltd.), etc. In order to stably perform the step B or b, it is preferable to add the above-mentioned base or acid after the step A or a The sol comprising crystalline cerium oxide particles according to the present invention can contain further water-soluble polymer, anionic surfactant, nonionic surfactant or cationic surfactant. Illustrative example of them are as follows: water-soluble polymer, such as polyvinyl alcohol, acrylic polymer and ammonium salt thereof, methacrylic polymer and ammonium salt thereof, etc; anionic surfactant, such as ammonium oleate, ammonium laurate, triethanolamine lauryl sulfate, ammonium polyoxyethylene lauryl ether sulfate, etc.; nonionic surfactant, such as polyoxyethylene lauryl ether, polyoxyethylene sorbitan monolaurate, polyoxyethylene glycol disterate, polyethylene glycol monostearate, etc. The surfactants may be added in an amount of 0.01 to 100 parts by weight on the basis of 100 parts by weight of crystalline ceric oxide particles.

Observations by scanning electron microscope (SEM) or transmission electron microscope (TEM) indicate that the sol comprising crystalline ceric oxide particles according to the present invention has a particle size ranging from 20 to 300 nm by primary particle. In addition, the particles are measured of diffraction pattern with an X-ray diffraction apparatus after drying them at 110° C. As a result of it, it is revealed that the particles have high crystallinity of cubic crystal system and are ceric oxide particles having a diffraction pattern with main peaks at diffraction angles $2\theta=28.6°$, $47.5°$ and $56.4°$ and described in ASTM Card No. 34-394. The particles in the sol have the particle size (BET converted-particle size) ranging from 10 to 200 nm that is converted from the specific surface area of the particles by a gas adsorption method (BET method), and a ratio of a particle size measured by dynamic light scattering method to the particle size converted from a specific surface area by gas adsorption method ranging from 2 to 6, therefore the sol comprises crystalline ceric oxide particles that are approximately monodisperse. Accordingly, even when the sol of the present invention is left for a long time, a part of the particles precipitates but can be easily re-dispersed by stirring or shaking and return to the initial dispersion state. Therefore, the sol of the present invention is stable for more than one year when it is kept at ordinary temperature.

The crystalline ceric oxide sol according to the present invention can be used as abrasives, ultraviolet absorbing materials, catalyst materials, fuel cell materials and the like in the form of sol comprising ceric oxide prepared by re-dispersing the particles in aqueous medium, water-soluble organic solvent or mixed solvent of water with water-soluble organic solvent The crystalline ceric oxide sol according to the present invention is composed of crystalline particles that are dispersed in approximately monodisperse state. Accordingly, the ceric oxide particles according to the present invention having positive charge can be adsorbed uniformly on polymer particles having negative charge in a aqueous medium. Thus, it is expected that the cerium oxide-polymer complex is useful for abrasive. As the polymer particles having negative charge, it is preferable to use polymers having an anion functional group, such as hydroxyl, carboxyl, sulfonyl or the like thereon. The particle size of the polymer must be larger than that converted from a specific surface area of the crystalline ceric oxide particles of the present invention by gas adsorption method so that the ceric oxide particles will cover uniformly the polymers, and is preferably set to 5 times to more than 10 times the particle size of the crystalline ceric oxide particles. The particle size of the polymer usually ranges from 1 to 100 μm. The crystalline ceric oxide particles having positive charge cover the polymer having negative charge. The amount of the particles and polymers may be selected in such a manner that a ratio by weight of the crystalline ceric oxide particles to the polymer is 0.05 and 3.0 as lower and upper limits, respectively. In the meantime, the crystalline ceric oxide particles may be added over the upper limit. However, in that case, a mixture of organic-inorganic complex particles and crystalline ceric oxide particles is prepared.

The crystalline ceric oxide sol according to the present invention may contain rare earth elements, such as lanthanum, neodymium, praseodymium and the like that do not deteriorate the characteristics of the sol.

The conventional sol comprising crystalline ceric oxide particles tends to occur sedimentation of particles therein because the particles are weakly held together to form large particles. Once the sedimentation occurs, it is difficult to re-disperse and return completely to the original state. In addition, when the conventional sol is used for an abrasive, it is not said that the surface polished with the abrasive has sufficient surface profile. On the other hand, the present invention provides a sol that is approximately monodisperse by wet-grinding the sol comprising crystalline ceric oxide particles prepared in advance to impart shearing force and impact force to them thereby dividing particles held together. And the divided particles are not held together nor aggregated again. The wet grinding can be carried out with any apparatus that generates shearing force and impact force rather than stirring force at high speed such as a disper and so on. As such an apparatus, it is preferable to use a wet-ball mill, a sand grinder, an attritor, a perl mill, an ultrasonic homogenizer, a pressure homogenizer, an ultimaizer or the like. The present inventors find out that the particles held together can be divided by wet-grinding colloidal particles of crystalline ceric oxide prepared in advance to impart shearing force and impact force, and therefore, in order to achieve it, the wet-grinding is carried out in the step B or b in the present invention.

The present invention resolves the problem that particles are held together by imparting shearing force and impact force to them, and makes possible to produce a sol comprising crystalline ceric oxide particles approximately monodisperse that was difficult to be produced in the prior art. When the crystalline ceric oxide sol with monodispersion properties is used for an abrasive, the abrasive does not sediment nor deposit in the line from a part feeding it to a polishing apparatus Therefore, the present invention enables to provide abrasives with constant and high quality that exert constant polishing performance because the abrasives do not sediment nor deposit even when they are used for a long time. The abrasives obtained in the present invention impart good polished surface to objects to be polished while maintaining high removal rate.

EXAMPLES

The present invention will hereinafter be described in more detail with reference to the following non-imitative examples, but the present invention is not restricted to these specific examples.

Example 1

A 500-liter glass lining reactor was charged with 44.3 kg of pure water and 94.8 kg of aqueous 25% ammonia solution corresponding to $NH_3/Ce^{3+}=6$ (molar ratio), and while blowing 3 $Nm^3/hr$ of nitrogen gas therein through a resin nozzle and keeping the liquid temperature at 30° C., 508.0 kg of an aqueous cerium (III) nitrate solution in which the concentration of cerium was 7.84 wt % in terms of $CeO_2$ was gradually added with stirring over 30 minutes to give a suspension of hydroxide. The temperature of the suspension was then elevated to 80° C. Thereafter, the gas to be blown through the resin nozzle was switched from nitrogen gas to 4 $Nm^3/hr$ of air, thereby the oxidation reaction for converting cerium (III) to cerium (I) was started. The oxidation reaction was completed in 5 hours. The liquid after the completion of the oxidation reaction was returned to room temperature to obtain a reaction solution of pH 9.4 containing white fine particles.

The reaction solution was washed with the aid of a rotary filter press (manufactured by Kotobuki Giken Co., Ltd.) to obtain 172 kg of white slurry (A-1) having a solid content of 23.2 wt %, pH of 9.1 and an electric conductivity of 40 μS/cm. The washed slurry was observed by transmission electron microscope (TEM) and it was verified that the particles therein had the primary particle size of 40 to 80 nm. The particles were dried and the powder X-ray diffraction observation for the dried particles revealed that the obtained particles had characteristic peaks that coincided with the characteristic peaks of crystalline ceric oxide of cubic crystal system having a diffraction pattern with main peaks at diffraction angles $2\theta=28.6$, $47.5°$ and $56.4°$ and described in ASTM Card No. 34-394. The specific surface area value of the obtained ceric oxide particles by gas adsorption method (BET method) was 30 $m^2/g$ and the particle size converted therefrom was 28 nm. On the other hand, the particle size measured by dynamic light scattering method with the aid of N4 (manufactured by Coulter Electronics, Inc.) was 385 nm. Accordingly, the ratio of the particle size measured by dynamic light scattering method to the particle size converted from a specific surface area by gas adsorption method (hereinafter, the ratio is referred to as "ratio of particle sizes") was 13.8.

To 74 kg of the washed slurry, quaternary ammonium silicate hydroxide was added in a molar ratio of $(NR_4^+)/(CeO_2)$ of 0.015, and the concentration thereof was adjusted by the addition of pure water to give 81 kg of an alkaline sol (A'-1) having a solid content of 21.1 wt %, pH of 10.9, an electric conductivity of 1850 $\mu$S/cm and a viscosity of 1.8 mPa·S.

81 kg of the alkaline sol was placed in a bucket, and supplied to an ultrasonic homogenizer (manufactured by Nissei Ltd.) having 1200 W of output at a flow rate of 1.1 l/min., and the sol was ground for 19 hours while circulating it. The ground sol (B-1) had a solid content of 21.1 wt %, pH of 10.6, an electric conductivity of 1670 $\mu$S/cm and a viscosity of 1.8 mPa·S. The particle size measured by dynamic light scattering method was 163 nm, therefore the ratio of particle sizes was 5.8.

Example 2

A sand grinder with internal volume of 700 ml was charged with 350 g of the alkaline sol (A'-1) obtained in Example 1 and 1217 g of partially stabilized zirconia beads with $\phi$0.5 mm, and the sol was ground for 3 hours by stirring the stirring blade in the grinder at 1000 rpm. The ground sol (B-2) had a solid content of 21.1 wt %, pH of 10.5, an electric conductivity of 1630 $\mu$S/cm and a viscosity of 1.8 mPa·S. The particle size measured by dynamic light scattering method was 92 nm, therefore the ratio of particle sizes was 3.3.

Example 3

A 500-liter glass lining reactor was charged with 44.3 kg of pure water and 94.8 kg of aqueous 26% ammonia solution corresponding to $NH_3/Ce^{3+}$=6 (molar ratio), and while blowing 3 $Nm^3$/hr of nitrogen gas therein through a resin nozzle and keeping the liquid temperature at 30° C., 508.0 kg of an aqueous cerium (III) nitrate solution in which the concentration of cerium was 7.84 wt % in terms of $CeO_2$ was gradually added with stirring over 30 minutes to give a suspension of hydroxide. The temperature of the suspension was then elevated to 85° C. Thereafter, the gas to be blown through the resin nozzle was switched from nitrogen gas to 4 $Nm^3$/hr of air, thereby the oxidation reaction for converting cerium (III) to cerium (M) was started. The oxidation reaction was completed in 5 hours The liquid after the completion of the oxidation reaction was returned to room temperature to obtain a reaction solution of pH 9.2 containing white fine particles.

The reaction solution was washed with the aid of a rotary filter press (manufactured by Kotobuki Giken Co., Ltd.) to obtain 187 kg of white slurry (A-2) having a solid content of 21.4 wt %, pH of 8.0 and an electric conductivity of 24 $\mu$S/cm. The washed slurry was observed by transmission electron microscope (TEM) and it was verified that the particles therein had the primary particle size of 40 to 100 nm. The particles were dried and the powder X-ray diffraction observation for the dried particles revealed that the obtained particles had characteristic peaks that coincided with the characteristic peaks of crystalline ceric oxide of cubic crystal system having a diffraction pattern with main peaks at diffraction angles 2θ=28.6°, 47.5° and 56.4° and described in ASTM Card No. 34-394. The specific surface area value of the obtained ceric oxide particles by gas adsorption method (BET method) was 20 m/g and the particle size converted therefrom was 42 nm. On the other hand, the particle size measured by dynamic light scattering method with the aid of DLS-6000 (manufactured by Otsuka Electronics Co., Ltd.) was 417 nm. Accordingly, the ratio of particle sizes was 10.

To 110 kg of the washed slurry (A-2), aqueous 10 wt % nitric acid solution was added in a molar ratio of $(HNO_3/CeO_2)$ of 0.005, and the concentration thereof was adjusted by the addition of pure water to give 117 kg of an alkaline sol (A'-2) having a solid content of 201 wt %, pH of 4.8, an electric conductivity of 39 $\mu$S/cm and a viscosity of 1.9 mPa·S.

117 kg of the acid sol was placed in a bucket, and supplied to a pressure homogenizer (manufactured by SMT Ltd.) having 400 $kg/cm^2$ of pressure at a flow rate of 1 l/min., and the sol was ground overnight. Three times of the procedures gave the sol (B-3) having a solid content of 20.1 wt %, pH of 4.8, an electric conductivity of 57 $\mu$S/cm and a viscosity of 1.5 mPa·S. The particle size of the sol measured by dynamic light scattering method was 177 nm, therefore the ratio of particle sizes was 4.2.

Example 4

A 500-liter glass lining reactor was charged with 44.3 kg of pure water and 94.8 kg of aqueous 25% ammonia solution corresponding to $NH_3/(Ce^{3+}+La^{3+})$=6 (molar ratio), and while blowing 3 $Nm^3$/hr of nitrogen gas therein through a resin nozzle and keeping the liquid temperature at 30° C., 508.0 kg of an aqueous cerium (III) nitrate solution in which the concentration of cerium was 7.84 wt % in terms of $CeO_2$ and 14.3 kg of an aqueous lanthanum (III) nitrate solution in which the concentration of lanthanum was 14.0 wt % in terms of $La_2O_3$ were gradually added with stirring over 30 minutes to give a suspension of hydroxide. The temperature of the suspension was then elevated to 75° C. Thereafter, the gas to be blown through the resin nozzle was switched from nitrogen gas to 4 $Nm^3$/hr of air, thereby the oxidation reaction for converting cerium (III) to cerium (IV) was started. The oxidation reaction was completed in 5 hours. The liquid after the completion of the oxidation reaction was returned to room temperature to obtain a reaction solution of pH 9.8 containing white fine particles.

The reaction solution was washed with the aid of a rotary filter press (manufactured by Kotobuki Giken Co., Ltd.) to obtain 185 kg of white slurry (A-3) having a solid content of 21.7 wt %, pH of 9.1 and an electric conductivity of 98 $\mu$S/cm. The washed slurry was observed by transmission electron microscope (TEM) and it was verified that the particles therein had the primary particle size of 40 to 100 nm. The particles were dried and the powder X-ray diffraction observation for the dried particles revealed that the obtained particles had characteristic peaks that coincided with the characteristic peaks of crystalline ceric oxide of cubic crystal system having a diffraction pattern with main peaks at diffraction angles 2θ=28.6°, 47.5° and 56.4° and described in ASTM Card No. 34-394. The specific surface area value of the obtained ceric oxide particles by gas adsorption method (BET method) was 20 $m^2$/g and the particle size converted therefrom was 41 nm. On the other hand, the particle size measured by dynamic light scattering method with the aid of DLS-6000 (manufactured by Otsuka Electronics Co., Ltd.) was 480 nm. Accordingly, the ratio of particle sizes was 12.

To 45 kg of the washed slurry (A-3), aqueous 10 wt % nitric add solution was added in a molar ratio of (HNO$_3$)(CeO$_2$) of 0.003, and the concentration thereof was adjusted by the addition of pure water to give 48 kg of an acid sol (A'-3) having a solid content of 20.3 wt %, pH of 4.5, an electric conductivity of 29 μS/cm and a viscosity of 40.8 mPa·S. 500 g of the acid sol was placed in 500 cc polyurethane container, and subjected to an ultrasonic homogenizer (manufactured by Nissei Ltd.) having output of 1200 W for 10 minutes to grind it. The ground sol (B-4) had a solid content of 203 wt %, pH of 4.8, an electric conductivity of 26 μS/cm and a viscosity of 40.5 mPa·S. The particle size measured by dynamic light scattering method was 190 nm, therefore the ratio of particle sizes was 4.6.

Example 5

Commercial cerium carbonate powder with a purity of 99.9% (mean particle size by laser diffraction method: 38 μm) was calcined in an electric furnace with internal volume of 0.5 mg for 15 hours at 750° C. to give 36 kg of calcined powder composed of powders the primary particle size of which ranges from 15 to 30 nm by scanning electron microscope (SEM) observation. The powder X-ray diffraction observation for the powder revealed that it had characteristic peaks that coincided with the characteristic peaks of crystalline ceric oxide of cubic crystal system having a diffraction pattern with main peaks at diffraction angles 2θ=28.6°, 47.5° and 56.4° and described in ASTM Card No. 34-394. The specific surface area value of the obtained ceric oxide particles by gas adsorption method (BET method) was 17 m$^2$/g and the particle size converted therefrom was 50 nm. 96 g of the obtained ceric oxide particles was dispersed into 193 g of pure water, and 2 g of aqueous 10 wt % nitric acid solution was further added thereto to give 291 g of ceric oxide slurry. A sand grinder with internal volume of 700 ml was charged with 1.05 kg of partially stabilized zirconia beads with φ0.5 mm and 291 g of the ceric oxide slurry, and the slurry was wet-ground at 1500 rpm for 5 hours. After grinding, the beads were separated with 250 g of pure water to give 500 g of an acid sol (B-5) having pH of 6.1, an electric conductivity of 77 μS/cm and a solid content of 18 wt %. The specific surface area value of the obtained ceric oxide particles by a gas adsorption method (BET method) was 52 m$^2$/g and the particle size converted therefrom was 16 nm. On the other hand, the particle size measured by dynamic light scattering method with the aid of DLS-6000 (manufactured by Otsuka Electronics Co., Ltd.) was 100 nm. Accordingly, the ratio of particle sizes was 6.

Example 6

Commercial pearl-like poly(methylmethacrylate) powder (mean particle size: 5 μm) to which hydroxyl groups were added was dispersed into 94 g of pure water, and then 122 g of the acid sol (B-5) and 0.4 g of aqueous 10 wt % nitric acid solution were added thereto to give an acid sol (B-6) having pH of 5.1 and an electric conductivity of 44 μS/cm in which the concentration of cerium was 10 wt % in terms of CeO$_2$. The sol was observed by transmission electron microscope (TEM) and it was verified that the crystalline ceric oxide particles therein with the particle size ranging from 15 to 30 nm adhered uniformly to the surface of the pearl-like polymers with mean particle size of 5 μm.

The sols obtained in Examples 1, 3, 4, 5 and 6, that is, A'-1, A'-2, A'-3, B-1, B-3, B-4, B-5 and B-6 respectively, were adjusted to the cerium concentration of 10 wt % in the terms of CeO$_2$ with pure water, and subjected to the following polishing test. In addition, these sols were placed in 120 cc styrol bottles, and then the level of sedimentation and deposition was compared one another after leaving these bottles for three days.

The polishing test was carried out for the above-mentioned sols as follows:
Polishing machine (trade name: LAPMASTER 18, manufactured by Lapmaster Corp.);
Polishing pad: non-woven fabric impregnated with polyurethane (trade name: POLITEX DG, manufactured by Rhodel Nitta Inc.);
Object to be polished: quartz glass (φ95.5 mm);
Revolution: 40 rpm
Polishing pressure: 80 g/cm$^2$; and
Polishing time: 10 minutes.

The polished surfaces were evaluated by observation with a polarization microscope at the magnifications of ×50 and ×400, and the results thereof were shown in Table 1. In Table 1, the mark (X) means that large surface defects were observed on the polished surface, the mark (○) means that small surface defects were observed on the polished surface, and the mark (◎) means that no surface defects were observed on the polished surface.

On the other hand, the level of the sedimentation and deposition was evaluated by observing with eyes whether any sediments appeared in the 120 cc styrol bottles or not In the Table 1, the word "presence" is indicated when the sediments were detected, and the word "absence" is indicated when no sediments were detected.

TABLE 1

| Sol | CeO$_2$ Concentration (wt %) | Removal Rate (μm/hr) | Polished Surface | Level of Sedimentation and Deposition |
|---|---|---|---|---|
| A'-1 | 10 | 1.3 | ○ | presence |
| A'-2 | 10 | 1.6 | ○ | presence |
| A'-3 | 10 | 4.2 | ○ | presence |
| B-1 | 10 | 1.2 | ◎ | absence |
| B-3 | 10 | 1.6 | ◎ | absence |
| B-4 | 10 | 4.1 | ◎ | absence |
| B-5 | 10 | 4.2 | ◎ | absence |
| B-6 | 10 | 5.8 | ◎ | absence |

From the results shown in Table 1, it is clear that the sols B-1, B-3, B-4, B-5 and B-6 which were obtained by grinding the sols A'-1, A'-2 or A'-3 with ultrasonic homogenizer, pressure homogenizer or the like to the ratio of the particle size measured by centrifugal sedimentation method to the particle size converted from specific surface area by gas adsorption method and the ratio of the particle size measured by dynamic light scattering method to the particle size converted from specific surface area by gas adsorption method both of which range from 2 to 6, have approximately same removal rate, and that polished surfaces by these sols have improved quality, and further that sedimentation and deposition are not observed in these sols. It is also verified that the sol B-6 has an improved removal rate.

As mentioned in detail above, the present invention provides a sol in which crystalline ceric oxide particles are approximately monodisperse. Therefore, the sols of the present invention has high stability under conservation. Further, as the primary particle size of the crystalline ceric oxide particles is maintained, the sols are suitable as an abrasive for a substrate which comprises silica as a main component, and enables to polishing at high removal rate and gives the surface of polished object with high quality.

In addition, the ceric oxide particles in the sols of the present invention are crystalline particles and dispersed into a medium in an approximately monodisperse state. Therefore, the crystalline ceric oxide particles can be adsorbed uniformly on polymer particles having negative charge to give a ceric oxide-polymer complex that is suitable for an abrasive with outstanding polishing performance.

Accordingly, the sols of the present invention are suitable as an abrasive for smoothing-polishing in producing process of semiconductor device that is generally called CMP (Chemical Mechanical Polishing). In particular, the sols are suitable as an abrasive used in a process of isolating elements of semiconductor device that is generally called STI (Shallow Trench Isolation) because it can accurately polish an object to be polished without damage to silicon nitride film used as a protective film. The sols are also suitable as an abrasive for polishing low permittivity materials for Inter Layer Dielectric (ILD) of semiconductor device, such as siloxanes, organic polymers, porous materials, CVD polymers, etc. The siloxanes include, for example hydrogenated silsesquioxane, methylsilsesquioxane, hydrogenated methylsilsesquioxane or the like. The organic polymers include, for example polyarylene ether, heat polymerizable hydrocarbons, perfluorohydrocarbons, polyquinoline, fluorinated polyimides or the like. The porous materials include, for example xerogel, silica colloid or the like. The CVD polymers include, for example fluorocarbons, aromatic hydrocarbon polymers, siloxane polymers or the like.

The substrate comprising silica as a main component in the present invention includes, for example a rock crystal, a quartz glass, a glass hard disk, an organic film of semiconductor device, ILD and CMP of trench isolation, etc. The sole of the present invention can be also applied for polishing optical crystal materials, such as lithium niobate, lithium tantalate and the like, ceramics materials, such as aluminum nitride, alumina, ferrite, zirconium and the like, metals, such as aluminum, copper, tungsten and the like.

What is claimed is:

1. A sol comprising crystalline ceric oxide particles, in which the particles have particle size I ranging from 10 nm to 200 nm and a ratio of particle size II to the particle size I ranging from 2 to 6, wherein the particle size I is a particle size converted from a specific surface area by gas adsorption method, and the particle size II is a particle size measured by dynamic light scattering method.

2. A process for producing a sol comprising crystalline ceric oxide particles according to claim 1, characterized in that comprises the following steps A and B:

Step A of reacting a cerium (III) salt with an alkaline substance in $(OH^-)/(Ce^{3+})$ molar ratio ranging from 3 to 30 in an aqueous medium under an inert gas atmosphere to produce a suspension of cerium (III) hydroxide, and immediately blowing oxygen or a gas containing oxygen into the suspension at a temperature of 10 to 95° C. under an atmospheric pressure to produce a sol comprising crystalline ceric oxide particles, in which the particles have particle size I ranging from 10 nm to 200 nm and a ratio of particle size II to the particle size I ranging 10 or more, wherein the particle size I is a particle size converted from a specific surface area by gas adsorption method, and the particle size II is a particle size measured by dynamic light scattering method; and Step B of wet-grinding the sol obtained in step A.

3. A process for producing according to claim 2, wherein the alkaline substance is a hydroxide of alkaline metal, an organic base or a mixture thereof.

4. A process for producing according to claim 2, wherein the gas containing oxygen is air or a mixed gas of oxygen and nitrogen.

5. A process for producing a sol comprising crystalline ceric oxide particles according to claim 1, characterized in that the process comprises the following steps a and b:

Step a of calcining cerium carbonate at a temperature of 300 to 1100° C. to give crystalline cerium oxide particles; and Step b of wet-grinding the particles obtained in step a.

6. A process for producing according to claim 2, wherein the wet-grinding is carried out with a wet-ball mill, a sand grinder, an attritor, a perl mill, an ultrasonic homogenizer, a pressure homogenizer or an ultimaizer.

7. An aqueous slurry comprising organic-inorganic complex particles, in which the crystalline ceric oxide particles according to claim 1 are adsorbed on negatively charged polymer particles.

8. A process for producing according to claim 3, wherein the gas containing oxygen is air or a mixed gas of oxygen and nitrogen.

9. A process for producing according to claim 3, wherein the wet-grinding is carried out with a wet-ball mill, a sand grinder, an attritor, a perl mill, an ultrasonic homogenizer, a pressure homogenizer or an ultimaizer.

10. A process for producing according to claim 4, wherein the wet-grinding is carried out with a wet-ball mill, a sand grinder, an attritor, a perl mill, an ultrasonic homogenizer, a pressure homogenizer or an ultimaizer.

11. A process for producing according to claim 5, wherein the wet-grinding is carried out with a wet-ball mill, a sand grinder, an attritor, a perl mill, an ultrasonic homogenizer, a pressure homogenizer or an ultimaizer.

* * * * *